(12) United States Patent
Steben et al.

(10) Patent No.: US 12,445,531 B2
(45) Date of Patent: Oct. 14, 2025

(54) SYSTEM AND METHOD FOR DETERMINING DEVICE LOCATION AND PROVIDING ACCESS AUTHORIZATION

(71) Applicant: VERIZON PATENT AND LICENSING INC., Basking Ridge, NJ (US)

(72) Inventors: Jerry Steben, Fort Worth, TX (US); Samirkumar Patel, Middlesex, NJ (US); Ye Huang, San Ramon, CA (US); Helen Osias Eglip, Sammamish, WA (US); Anthony Mathias George, Springville, UT (US); Parry Cornell Booker, Sunnyvale, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 18/464,775

(22) Filed: Sep. 11, 2023

(65) Prior Publication Data
US 2024/0163343 A1    May 16, 2024

Related U.S. Application Data

(63) Continuation of application No. 18/055,487, filed on Nov. 15, 2022, now Pat. No. 11,792,282.

(51) Int. Cl.
H04L 67/52 (2022.01)
(52) U.S. Cl.
CPC .................. H04L 67/52 (2022.05)

(58) Field of Classification Search
CPC ........................................... H04L 67/52
See application file for complete search history.

(56) References Cited

U.S. PATENT DOCUMENTS

| | | | |
|---|---|---|---|
| 6,704,295 B1 | 3/2004 | Tari et al. | |
| 9,064,219 B2 | 6/2015 | Hall et al. | |
| 9,131,339 B1* | 9/2015 | Kulfan | H04W 8/245 |
| 2003/0165241 A1* | 9/2003 | Fransdonk | G06Q 20/12 |
| | | | 380/258 |
| 2007/0027809 A1* | 2/2007 | Alve | H04W 4/02 |
| | | | 705/51 |
| 2007/0135135 A1 | 6/2007 | Brown | |
| 2009/0298514 A1* | 12/2009 | Ullah | G06Q 30/02 |
| | | | 340/572.1 |
| 2011/0167440 A1* | 7/2011 | Greenfield | H04L 63/107 |
| | | | 455/411 |
| 2014/0149507 A1* | 5/2014 | Redfern | G06Q 50/01 |
| | | | 709/204 |

(Continued)

*Primary Examiner* — Benjamin M Thieu

(57) ABSTRACT

In the various embodiments, systems and methods are disclosed for determining the location of User Equipment (UE) in a network and for authorizing access to content based on said location. An aspect of the present disclosure is a method including receiving, by a Content Authorization Function (CAF), a request to provide a UE type of a UE and a physical location associated with the UE, the request including a UE Internet Protocol (IP) address associated with the UE; querying, by the CAF, a Network Function (NF), to provide the UE type and associated physical location, the query including the UE IP address; receiving, by the CAF from the NF, the UE type and associated physical location; and transmitting the UE type and associated physical location.

20 Claims, 7 Drawing Sheets

(56) References Cited

U.S. PATENT DOCUMENTS

2017/0124303 A1* 5/2017 Baldwin ............... H04W 4/029
2017/0142024 A1 5/2017 Fromentoux et al.
2017/0331805 A1* 11/2017 Pham ................. G06Q 30/0271
2019/0379748 A1 12/2019 Gasnier et al.

* cited by examiner

SYSTEM AND METHOD FOR DETERMINING DEVICE LOCATION AND PROVIDING ACCESS AUTHORIZATION

CROSS REFERENCE TO RELATED APPLICATIONS

This application is a continuation of, and claims the benefit of priority from, U.S. patent application Ser. No. 18/055,487, filed Nov. 15, 2022, which is incorporated in its entirety by reference herein.

BACKGROUND

Generally, content providers limit access to resources or content delivery based on the geographic area of the user. For example, some streaming services may limit the delivery of live sports content related to a specific team to the city or region to which the team belongs. On mobile devices, resource or content consumption location can be determined by onboard GPS. However, Fixed Wireless Access (FWA) devices lack native GPS support or mechanisms to determine and provide content providers with location data.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
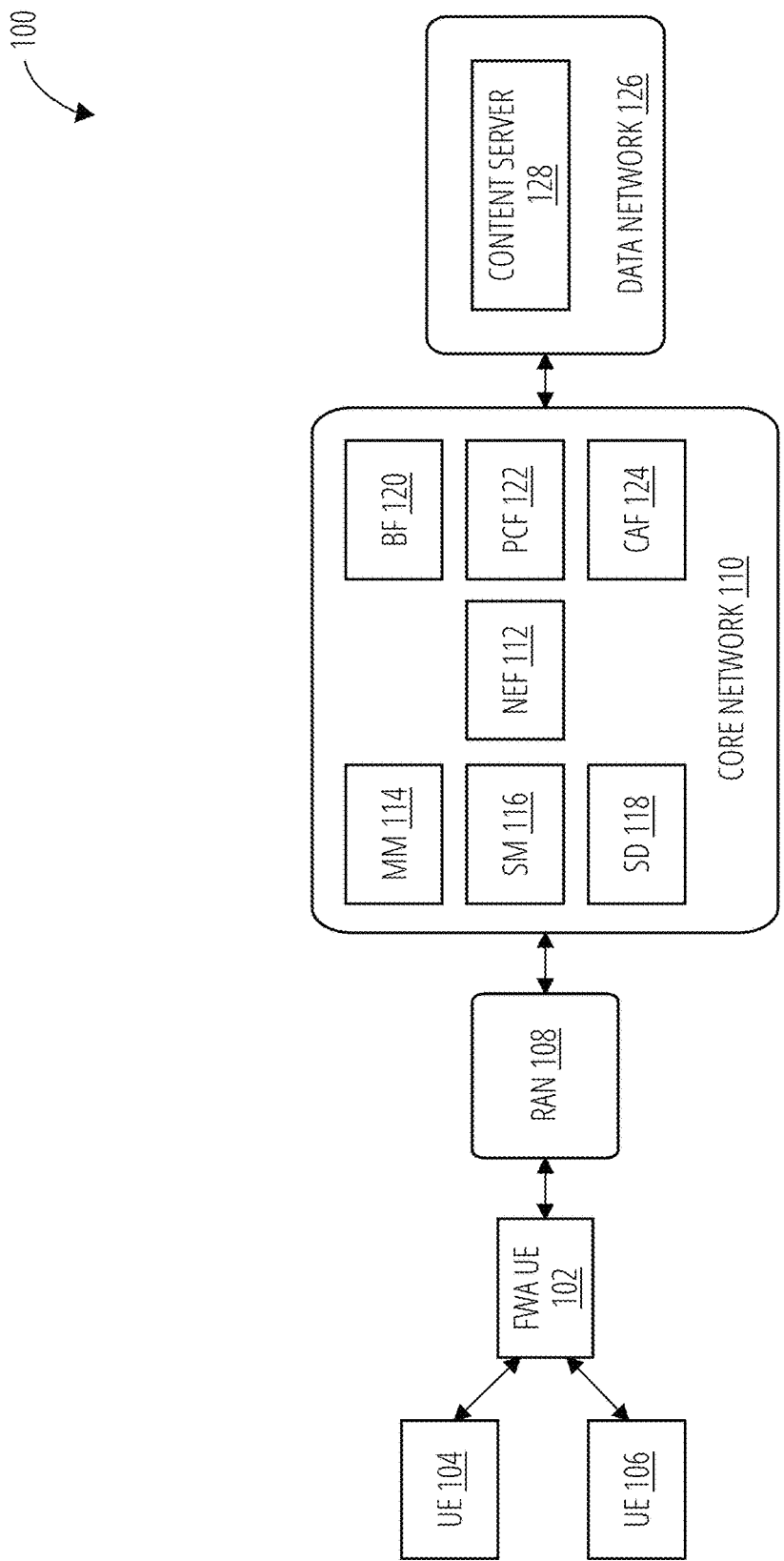
FIG. 1 is a block diagram of a network providing location-based authorization according to some embodiments.

In the various embodiments, systems and methods are disclosed for determining the location of User Equipment (UE) in a network and for authorizing access to content based on said location. In the embodiments, a novel Content Authorization Function (CAF) is disclosed that can provide services and resources to Network Functions (NFs) or other elements of a core network and/or a content provider data network. In some embodiments, the CAF communicates with one or more NFs of the core network to determine a UE device type and a physical location associated with a UE such as a Fixed Wireless Access (FWA) device, based on an IP address of the UE. In some embodiments, a content provider requests a type and physical location for a UE from the CAF in response to receiving a request to provide content from the UE.

In some aspects, the techniques described herein relate to a method including receiving, by CAF, a request to provide a UE type of a UE and a physical location associated with the UE, the request including a UE Internet Protocol (IP) address associated with the UE; querying, by the CAF, an NF, to provide the UE type and associated physical location, the query including the UE IP address; receiving, by the CAF from the NF, the UE type and associated physical location; and transmitting the UE type and associated physical location.

In some aspects, the UE can be an FWA device, and the associated physical location can be the location of the FWA device. In some aspects, the NF can be a Network Exposure Function (NEF). In some aspects, the UE can be communicatively connected to a base station of a Radio Access Network (RAN) and the associated physical location can be the location of the base station.

In some aspects, the method can include, prior to transmitting the UE type and associated physical location, modifying the associated physical location to change a level of location granularity based on a content provider requirement, and transmitting the UE type and modified associated physical location.

In some aspects, the NF can be a first NF and the method can include querying, by the first NF a second NF, to provide an identifier associated with the UE based on the UE IP address; receiving, by the first NF from the second NF, the identifier; querying, by the first NF a third NF, to provide the UE type and associated physical location based on the identifier; and, receiving, by the first NF from the third NF, the UE type and associated physical location.

In some aspects, the first NF can be an NEF, the second NF can be a Binding Support Function (BSF), and the third NF can be a Unified Data Management (UDM) function. In some aspects, the identifier can be selected from the group consisting of New Radio Cell Global Identifier (NCGI) and EUTRA Cell Global Identifier (ECGI).

In some aspects, the techniques described herein relate to a non-transitory computer-readable storage medium for storing instructions executable by a processor, the instructions comprising receiving, by a CAF, a request to provide a UE type of a UE and a physical location associated with the UE, the request including a UE Internet Protocol (IP) address associated with the UE; querying, by the CAF, an NF, to provide the UE type and associated physical location, the query including the UE IP address; receiving, by the CAF from the NF, the UE type and associated physical location; and transmitting the UE type and associated physical location.

In some aspects, the techniques described herein relate to a device comprising a processor configured to receive, by a CAF, a request to provide a UE type of a UE and a physical location associated with the UE, the request including a UE Internet Protocol (IP) address associated with the UE; query, by the CAF, an NF, to provide the UE type and associated physical location, the query including the UE IP address; receive, by the CAF from the NF, the UE type and associated physical location; and transmit the UE type and associated physical location.

FIG. 1 is a block diagram of a network providing location-based authorization according to some embodiments.

In an embodiment, a location-based authorization network 100 can include an FWA UE device 102 communicatively coupled to a Radio Access Network (RAN) 108. In some embodiments, one or more UEs 104-106 can be communicatively coupled to the FWA UE 102. In some embodiments, an FWA UE 102 can be a "last mile" device to communicatively connect UE to a RAN (e.g., RAN 108). In some embodiments, UE 104-106 and FWA UE 102 can be communicatively coupled over an air interface comprising a radio frequency communications link. In some embodiments, FWA UE 102 and one or more base stations of RAN 108 can be communicatively coupled over an air interface comprising a radio frequency communications link.

In some embodiments, UEs 104-106 can include Ultra-Reliable Low Latency Communications (URLLC) devices such as autonomous vehicle computing devices, IoT devices, remote surgery devices, and the like. In some embodiments, UEs 104-106 can include enhanced mobile broadband (eMBB) devices such as smartphones, tablets, and the like. In some embodiments, UEs 104-106 can include Massive Machine-Type Communications (mMTC) devices such as sensors, meters, and monitoring devices. In some embodiments, mMTC may be referred to as Massive Internet of Things (mIoT). In some embodiments, UEs 104-106 can include Customer Premise Equipment (CPE) devices. In some embodiments, FWA UE 102 can be a CPE device. No limit is placed on the number or type of UE or FWA UE devices in network 100.

In some embodiments, FWA UE 102 can communicate with RAN 108 through a plurality of base stations. In one embodiment, FWA UE 102 can connect to a 4G base station (e.g., an eNodeB) or a 5G base station (e.g., a gNodeB). In some embodiments, an FWA UE 102 can connect to both a 4G base station and a 5G base station in a Dual Connectivity (DC) setup.

In some embodiments, RAN 108 can be communicatively coupled to a core network 110. In some embodiments, core network 110 is a core network of a telecommunications service provider. In one embodiment, core network 110 can comprise a homogenous network. For example, the core network 110 can comprise an LTE core network. Alternatively, core network 110 can comprise a 5G core network. In one embodiment, the core network 110 can comprise two networks, such as an LTE core network and a 5G core network. In some embodiments, core network 110 can be communicatively coupled to Multi-access Edge Computing (MEC) resources. In some embodiments, MEC resources can be communicatively coupled to RAN 108 elements instead of or in addition to core network 110. In some embodiments, MEC can provide services and functions to UE and FWA UE devices.

In some embodiments, core network 110 can include a Network Exposure Function (NEF) 112 that securely exposes services and capabilities of network 100 to other elements of network 100. In some embodiments, the core network 110 can include a Mobility Manager (MM) 114 to manage control plane traffic. In some embodiments, MM 114 can include an Access and Mobility Management Function (AMF) of a 5G core network and/or a Mobility Management Entity (MME) of a 4G core network.

In some embodiments, the core network 110 can include a Session Manager (SM) 116. In an embodiment, SM 116 can comprise a Session Management Function (SMF) and User Plane Function (UPF) of a 5G network. Alternatively, in some embodiments, SM 116 can comprise a serving gateway (S-GW) of a 4G network. In an embodiment, SM 116 can provide all management functions of data sessions existing in the network 100. In general, SM 116 routes and forwards user data packets while also acting as the mobility anchor for the user plane during access point handovers and as the anchor for mobility between different network technologies.

In some embodiments, core network 110 can include a Subscriber Database (SD) 118 that includes user information including user account information, and user authorization and authentication data. In some embodiments, SD 118 can include UE information (e.g., UE location, UE type, UE identifiers) corresponding to FWA UE 102 and/or UE 104-106. In some embodiments, the UE information can be associated with a UE IP address. In some embodiments, SD 118 can provide UE information and user information as well as authentication/validation services to other applications or functions in the network 100. In some embodiments, the SD 118 can include a Unified Data Management (UDM) function and Unified Data Repository (UDR) function in a 5G network and/or a Home Subscriber Server (HSS) in a 4G network.

In some embodiments, core network 110 can include a Binding Function (BF) 120 and a Policy Control Function (PCF) 122. In some embodiments, the BF 120 can include a Binding Support Function (BSF) in a 5G network and/or a Session Binding Function (SBF) on a Diameter Routing Agent (DRA) in a 4G network. In some embodiments, BF 120 can bind different sessions on different interfaces of the network (e.g., between NFs or network elements, a PDU session) belonging to the same subscriber. In some embodiments, BF 120 can bind an application-function (e.g., CAF as described herein) to PCF 122. In some embodiments, PCF 122 can provide policy rules to other NFs (e.g., NEF 112, MM 114, SM 116, BF 120, CAF 124) based on policy subscription information included in the SD 118.

In some embodiments, core network 110 can include a novel CAF 124. In some embodiments, CAF 124 can provide services and resources to NFs and elements of a content provider data network 126. In some embodiments, CAF 124 can communicate with other NFs of core network 110 and data network 126 to provide user and UE (e.g., FWA UE 102) information. In some embodiments, CAF 124 can be communicatively coupled to content server 128 of the content provider. In some embodiments, CAF 124 can be communicatively coupled with a plurality of content servers of a plurality of content providers in respective data networks. While FIG. 1 illustrates CAF 124 as part of the core network, this disclosure is not so limited. In some embodiments, CAF 124 can be implemented as part of data network 126. For example, in some embodiments, CAF 124 can be part of a content server 128 of data network 126.

In some embodiments, core network 110 can be communicatively coupled to data network 126. In some embodiments, data network 126 can include content server 128. In some embodiments, content server 128 can include a content provider portal for access by a user or UE to access, request, or obtain content. In some embodiments, content can include audio, video, multimedia, message, webpage, or any sort of content, known or to be known, that may be provided by a content provider over a network 100. In some embodiments, content server 128 can include a streaming server of the content provider to provide live or streamed content. In some embodiments, content server 128 can include a notification server to communicate or otherwise notify users and UE regarding a request to provide content. In some embodiments, the notification server can notify a requesting entity that a request for access has been denied or that authorization request has failed.

According to some embodiments, the different functions or elements of RAN 108, core network 110, and data network 126 can be connected to each other. For example, in some embodiments, any of NEF 112, MM 114, SM 116, SD 118, BF 120, PCF 122, and CAF 124 can be communicatively coupled to any other NF or element of core network 110, RAN 108, and data network 126.

Figure 2:
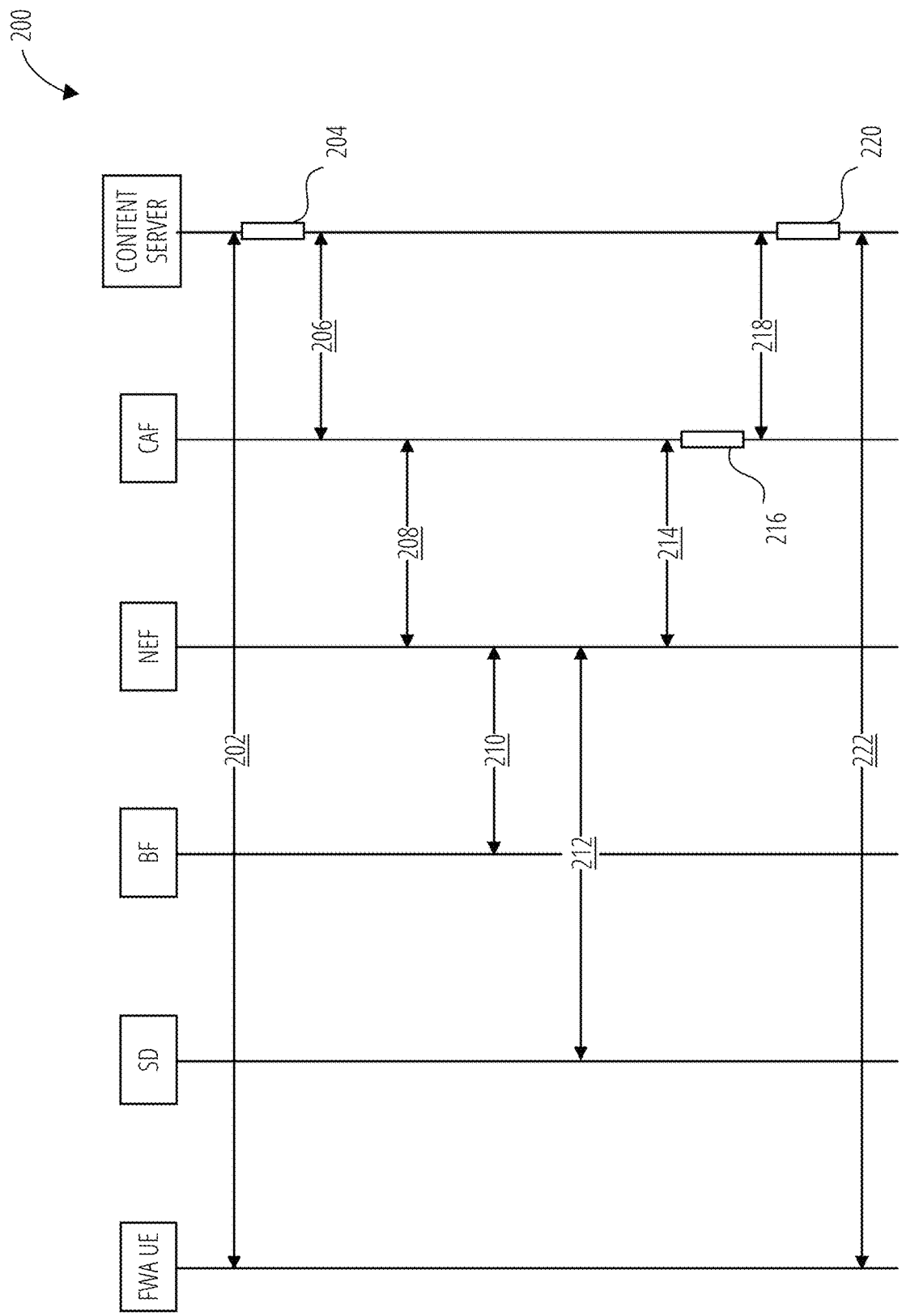
FIG. 2 is a call flow diagram illustrating a method for providing location-based authorization according to an embodiment.

FIG. 2 is a call flow diagram illustrating a method for providing location-based authorization according to an embodiment.

In Step 202, method 200 can include an FWA UE (or a client UE connected to the FWA UE) transmitting a content request to a content server (e.g., a streaming server) of a content provider to provide content. In some embodiments, the content request can include a UE IP address of the FWA UE or a client UE connected to the FWA UE. In some embodiments, the UE IP address of the FWA UE (or the client UE) can be associated with a service provider. In some embodiments, the content request can identify an item of content to be provided by the content server to the UE.

In some embodiments, prior to Step 202, method 200 can include the FWA UE or the client UE connected to the FWA UE establishing a Protocol Data Unit (PDU) session with a core network through a RAN, where the content server is communicatively coupled to the core network. In those embodiments, the core network and/or the RAN can be operated by the service provider. In some embodiments, prior to Step 202, method 200 can include the FWA UE or client UE connected to the FWA UE resolving the content server's Fully-Qualified Domain Name (FQDN) to determine an IP address (and optionally, a TCP port) of the content server. In some embodiments, prior to Step 202, the FWA UE or client UE can be in a Connection Management (CM) Connected or Registered state.

In Step 204, method 200 can include the content server determining a service provider associated with the UE IP address received in the content request. In some embodiments, the content server can perform an American Registry for Internet Numbers (ARIN) look-up to determine the service provider associated with the UE IP address. In some embodiments, the content server can maintain a database of IP addresses or portions of IP addresses and the corresponding service providers.

In Step 206, method 200 can include transmitting from the content server to a CAF a UE information query. In some embodiments, the CAF can be part of the core network of a service provider (e.g., the service provider identified in Step 204). In some embodiments, the content server can identify which CAF (in which core network) to direct the UE information query based on the service provider determined in Step 204. In some embodiments, the CAF can be part of a data network of a content provider. In some of those embodiments, the CAF can be implemented in the content server. In these embodiments, in Step 206, the UE information query can be transmitted within the content provider data network. In some embodiments, the UE information query can include the UE IP address or portions thereof.

In some embodiments, the UE information query can include a request to provide UE location information, UE identifiers, and/or UE type information of the UE associated with UE IP address in the content request. In some embodiments, the UE location information can have different types of granularity or location precision based on content provider requirements or service provider requirements. In some embodiments, the UE location information can include coordinates, mailing addresses, and/or geographical areas. In some embodiments, UE identifiers can include UE specific identifiers such as International Mobile Equipment Identity (IMEI) numbers. In some embodiments, UE identifiers can include cell network identifiers such as New Radio Cell Global Identifiers (NCGIs) or EUTRA Cell Global Identifiers (ECGIs). In those embodiments, the UE location can be the location of a cell or base station associated with the cell network identifier. In some embodiments, the type can be an FWA device. In some embodiments, the type can be any type of UE discussed herein.

In Step 208, method 200 can include transmitting an NEF query from the CAF to the NEF. In some embodiments, the NEF query can include the UE IP address or portions thereof. In some embodiments, the NEF query can include a request to provide information from the UE information query (e.g., UE location information, UE identifiers, and/or UE type information of the UE associated with UE IP address in the content request).

According to some embodiments, method 200 can include transmitting a plurality of requests to provide UE information and/or user information from one or more core NFs (e.g., MM, SM, SD, BF, PCF) or otherwise obtaining UE information from the NFs.

In the embodiment illustrated in FIG. 2, in Step 210, method 200 can include the NEF querying a BF to determine a UE identifier corresponding to the UE IP address. In some embodiments, the NEF can query the BF for a UE type corresponding to the UE IP address. For example, in some of those embodiments, the BF can determine any active sessions related to the UE IP address and then determine the UE identifier and/or UE type of any UEs associated with the active sessions.

Then, in Step 212, method 200 can include the NEF querying an SD to determine UE information and/or user information of a user associated with the UE (e.g., FWA UE or client UE) based on the UE identifier. In some embodiments, the UE information can include UE location information and/or UE type. In those embodiments, the NEF can determine UE location information from the user account information (e.g., a physical address associated with the user). In some embodiments, where the UE identifier is a network identifier, the UE location information can include the location of a base station or cell of a RAN of the service provider.

In Step 214, method 200 can include transmitting the UE information from the NEF to the CAF in response to the NEF query in Step 208. In some embodiments, the NEF can return a UE identifier and a UE type.

In Step 216, method 200 can include mapping by the CAF the UE identifier to the UE location. In some embodiments, CAF 124 can adjust the level of location granularity based on requirements from the content provider, the service provider, and/or privacy policies. For example, in some embodiments, CAF 124 can map the UE identifier to a physical location (e.g., address or coordinates) or geographical area (e.g., city, metropolitan area). In some embodiments, the result of Step 216 can be a mapped UE location. Table 1 illustrates an example mapping of UE identifiers to different levels of UE location information granularity.

TABLE 1

| Identifier | Coarse Location | Less Coarse Location | Fine Location |
|---|---|---|---|
| 123456 | City | Zip Code | Address |
| 789012 | Metropolitan Area | County | Coordinates |

In Step 218, method 200 can include transmitting by the CAF to the content server the mapped UE location, the UE type, and/or other UE information received from the NEF.

In Step 220, method 200 can include determining by the content server whether the UE location is an approved location for the content identified in the content request in Step 202. For example, in some embodiments, the content server can determine that a UE located within a specific metropolitan area can stream a game of the local baseball team. In some embodiments, in Step 220, method 200 can include the content server determining whether the specific EU type (e.g., an FWA device) requesting the content is an approved UE type to access or stream the requested content.

In Step 222, method 200 can include transmitting a message from the content server to the FWA UE or the client UE to indicate whether access is granted or denied. In some embodiments, the message can include the basis for denying access. For example, in some embodiments, the message can indicate that the type of device is not an approved UE type. In another example, in some embodiments, the message can indicate that the location of the UE is not approved for streaming the particular type of content.

Figure 3:
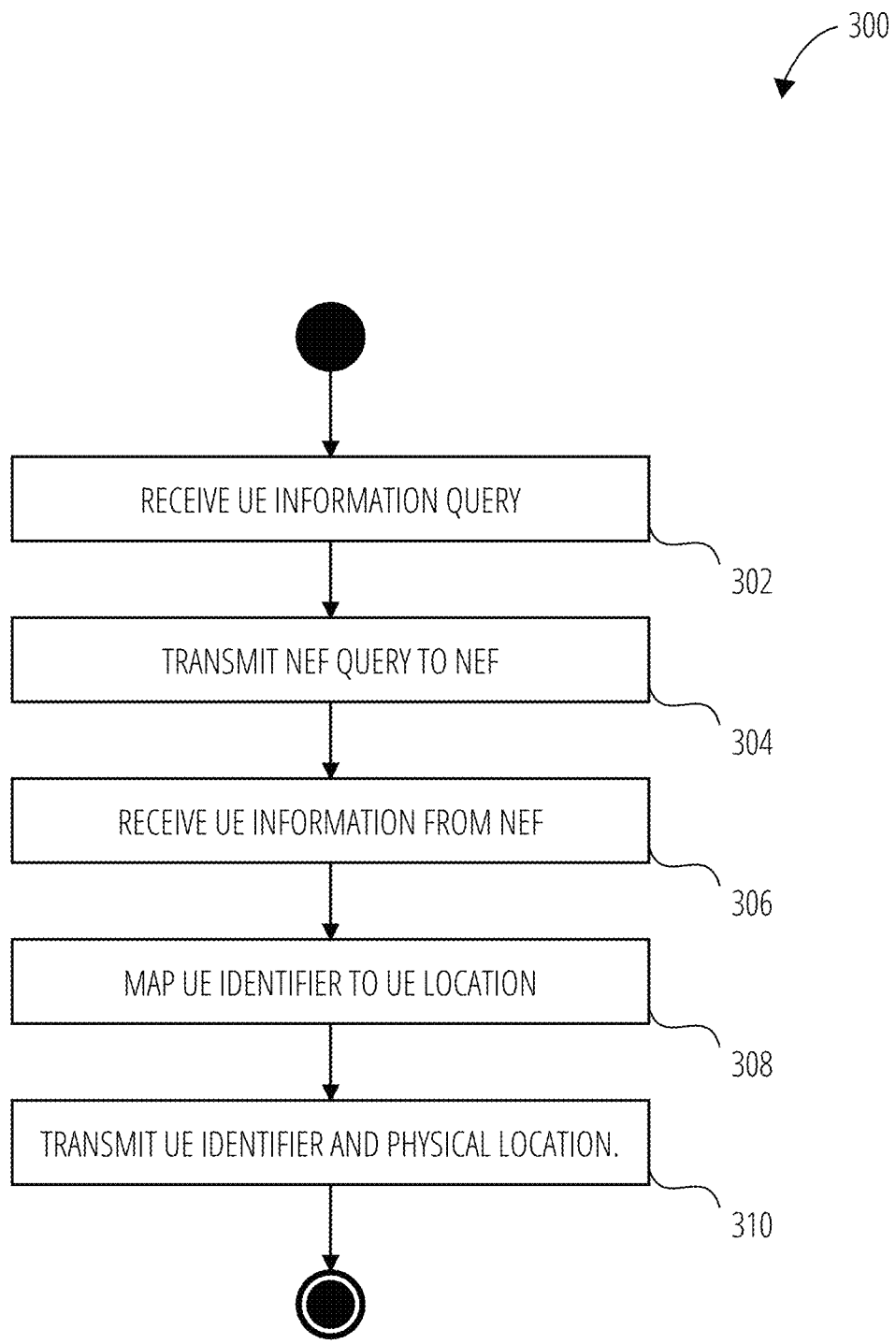
FIG. 3 is a flow diagram illustrating a method for determining a type and physical location of a User Equipment (UE) according to an embodiment.

FIG. 3 is a flow diagram illustrating a method for determining a type and physical location of a UE according to an embodiment.

In Step 302, method 300 can include receiving at a CAF a UE information query from a content server. In some embodiments, the UE information query can include a UE IP address associated with a UE. In some embodiments, the UE information query can include a request to provide UE location information, UE identifiers, and/or UE type information of the UE. In some embodiments, the UE location information is a physical location associated with the UE. In some embodiments, the UE location information can have different types of granularity or location precision based on content provider, service provider, or privacy requirements. In some embodiments, the UE location information can include coordinates, mailing addresses, and/or geographical areas. In some embodiments, UE identifiers can include UE specific identifiers such as International Mobile Equipment Identity (IMEI) numbers. In some embodiments, UE identifiers can include cell network identifiers such as New Radio Cell Global Identifiers (NCGIs) or EUTRA Cell Global Identifiers (ECGIs). In those embodiments, the UE location can be the location of a cell or base station associated with the cell network identifier. In some embodiments, the type can be an FWA device. In some embodiments, the type can be any type of UE discussed herein.

In Step 304, method 200 can include transmitting an NEF query from the CAF to the NEF. In some embodiments, the NEF query can include the UE IP address or portions thereof. In some embodiments, the NEF query can include a request to provide information from the UE information query (e.g., UE location information, UE identifiers, and/or UE type information of the UE). As discussed with respect to FIG. 2, the NEF can obtain the UE information from a plurality of NFs of the core network. In an embodiment, the NEF can query a BF to determine a UE identifier or UE type corresponding to the UE IP address. Then, in some embodiments, the NEF can query an SD to determine UE information and/or user information of a user associated with the UE based on the UE identifier.

In Step 306, method 300 can include receiving the UE information from the NEF at the CAF.

In Step 308, method 300 can include mapping by the CAF the UE identifier to the UE location. In some embodiments, mapping the identifier to the location can include modifying or adjusting a level of location granularity based on requirements from the content provider, the service provider, and/or privacy policies.

In Step 310, method 200 can include transmitting by the CAF to the content server the UE location, the UE type, and/or other UE information received from the NEF.

Figure 4:
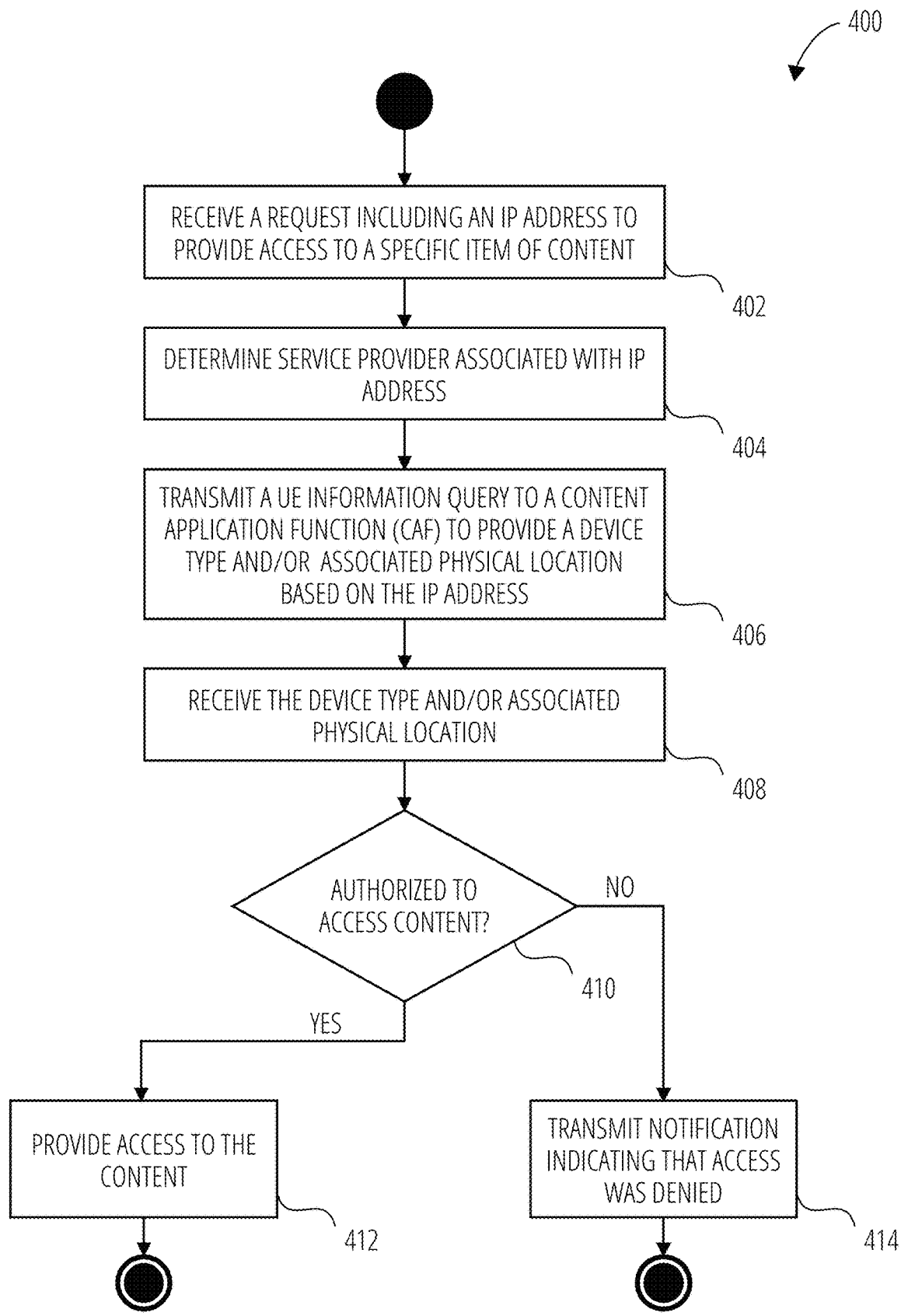
FIG. 4 is a flow diagram illustrating a method for providing location-based access to content according to an embodiment.

FIG. 4 is a flow diagram illustrating a method for providing location-based access to content according to an embodiment.

In Step 402, method 400 can include receiving a request to provide access to content. In some embodiments, the request can be received at a content server of a content provider. In some embodiments, the content server can be a streaming server. In some embodiments, the content can be live content. In some embodiments, the request can be sent by a UE (e.g., an FWA device) communicatively coupled to a RAN which in turn can be communicatively coupled to a core network of a service provider. In some embodiments, the core network of the service provider can be communicatively coupled to a data network of the content provider including a content server. In some embodiments, the content can be any type of content or data that can be provided over a network between a server and a UE.

In some embodiments, the request can include a UE IP address of a UE transmitting the request. In some embodiments, the UE IP address can be an IPv4 or IPv6 address. In some embodiments, the UE IP address can be associated with a service provider. In some embodiments, the content request can identify an item of content to be provided by the content server to the UE.

In Step 404, method 400 can include determining a service provider associated with the UE IP address. In some embodiments, determining the service provider can include performing an ARIN look-up. In some embodiments, determining the service provider includes matching the UE IP address or a portion thereof with IP address associated with the service provider.

In Step 406, method 400 can include transmitting a UE information query based on the UE IP address to a CAF of the core network of the service provider identified in Step 404. In some embodiments, the UE information query can be a request to provide a UE type and associated physical location of the UE. In some embodiments, the CAF can obtain the device type and associated physical location as discussed elsewhere herein.

In Step 408, method 400 can include receiving from the CAF the device type and the associated physical location. In some embodiments, the associated physical location can have a level of granularity predetermined by the content provider or the service provider. In some embodiments, the CAF can adjust the level of granularity of the associated physical location prior to sending the location information. Therefore, in some embodiments, the level of location information granularity of the associated physical location determined by the CAF can be different from the level of granularity of the associated physical location received in Step 408.

In Step 410, method 400 can include determining whether access should be granted to the content based on the device type, the associated physical location, the specific item of content requested, or a combination thereof. For example, in some embodiments, in Step 410, method 400 can include determining that an FWA device within the United States can stream a given live event while a different FWA device in Canada cannot. If the device should be granted access, method 400 continues to Step 412. If not, then method 400 continues to Step 414.

In Step 412, method 400 can include providing access to the content. In some embodiments, providing access to the content includes allowing the UE to stream, download, or otherwise access the specific item of content. In some embodiments, providing access to the content can include transmitting instructions to the UE to display a notification to a user that access has been granted.

In Step 414, method 400 can include transmitting a notification to the UE that access has been denied. In some embodiments, in Step 414, method 400 can include transmitting instruction to the UE to display a notification to a user indicating that access has been denied.

Figure 5:
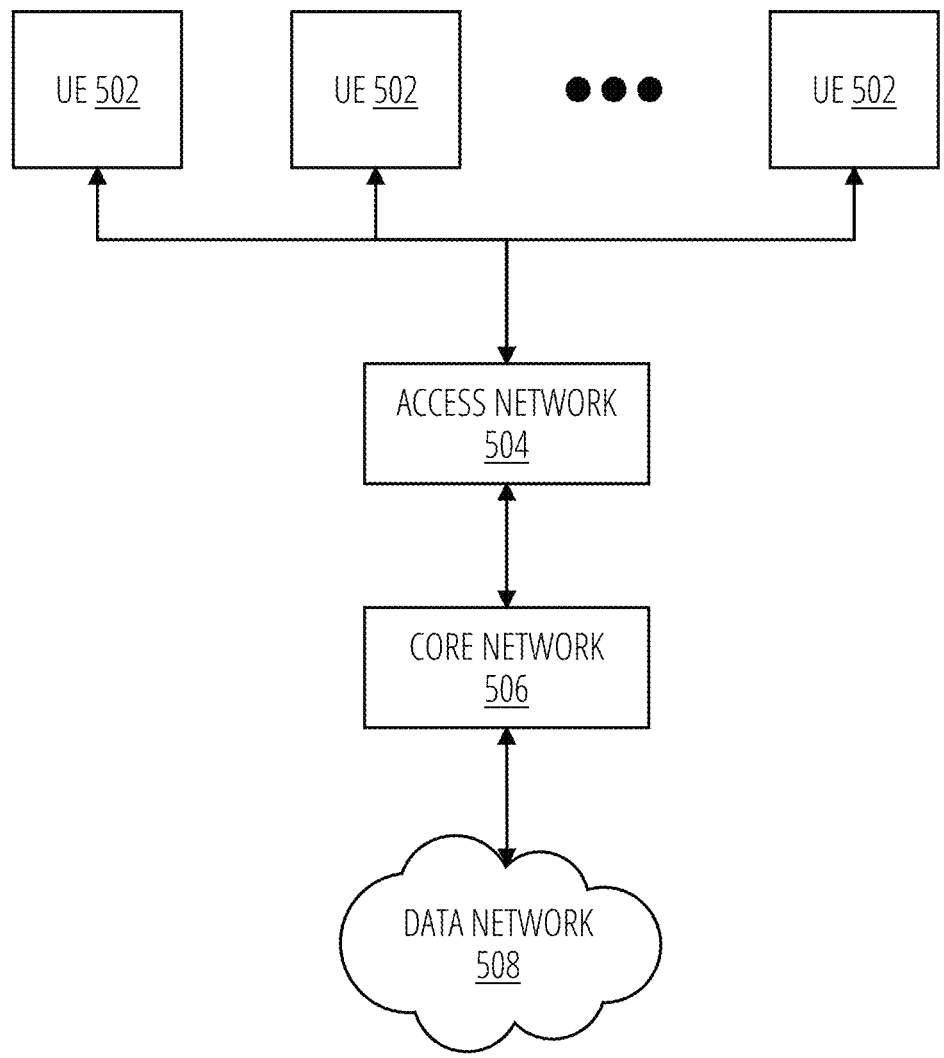
FIG. 5 is a block diagram of an example network architecture according to some embodiments.

FIG. 5 is a block diagram of an example network architecture according to some embodiments of the present disclosure.

In the illustrated embodiment, UE 502 can access a data network 508 via an access network 504 and a core network 506. In the illustrated embodiment, UE 502 can comprise any computing device capable of communicating with the access network 504 (e.g., device 700 discussed in relation to FIG. 7). As examples, UE 502 can include mobile phones, smart devices, tablets, laptops, sensors, IoT devices, autonomous machines, unmanned aerial vehicles (UAVs), wired devices, wireless handsets, and any other devices equipped with a cellular or wireless or wired transceiver. In some embodiments, UE 502 can include a 5G CPE. In some embodiments, UE 502 can include FWA devices.

In the illustrated embodiment of FIG. 5, the access network 504 can comprise a network allowing network communication with UE 502. In general, the access network 504 can include at least one base station that is communicatively coupled to the core network 506 and coupled to zero or more UE 502.

In some embodiments, the access network 504 can comprise a cellular access network, for example, a fifth-generation (5G) network or a fourth-generation (4G) network. In one embodiment, the access network 504 can comprise a NextGen Radio Access Network (NG-RAN), which can be communicatively coupled to UE 502. In an embodiment, the access network 504 can include a plurality of base stations (e.g., eNodeB (eNB), gNodeB (gNB)) communicatively connected to UE 502 via an air interface. In one embodiment, the air interface can comprise a New Radio (NR) air interface. For example, in a 5G network, UE 502 can be communicatively coupled to each other, and in some embodiments, for example, such coupling can be via Wi-Fi functionality, Bluetooth, or other forms of spectrum technologies, and the like.

In the illustrated embodiment, the access network 504 can provide the UE 502 access to a core network 506. In the illustrated embodiment, the core network may be owned and/or operated by a service provider or a network operator (NO) and provides wireless connectivity to UE 502 via access network 504. In the illustrated embodiment, this connectivity may comprise voice and data services.

At a high-level, the core network 506 may include a user plane and a control plane. In one embodiment, the control plane comprises network elements and communications interfaces to allow for the management of user connections and sessions. By contrast, the user plane may comprise network elements and communications interfaces to transmit user data from UE 502 to elements of the core network 506 and to external network-attached elements in a data network 508 such as, but not limited to, the Internet, a local area network (LAN), a wireless LAN, a wide area network (WAN), a mobile edge computing (MEC) network, a private network, a cellular network, and the like. In some embodiments, network elements may be physical elements such as router, servers and switches or may be virtual NFs implemented on physical elements.

In the illustrated embodiment, the access network 504 and the core network 506 may be operated by an NO. However, in some embodiments, the networks (504, 506) may be operated by a private entity, different entities, and the like, and may be closed to public traffic. In these embodiments, the operator of the device can simulate a cellular network, and UE 502 can connect to this network similar to connecting to a national or regional network.

Figure 6:
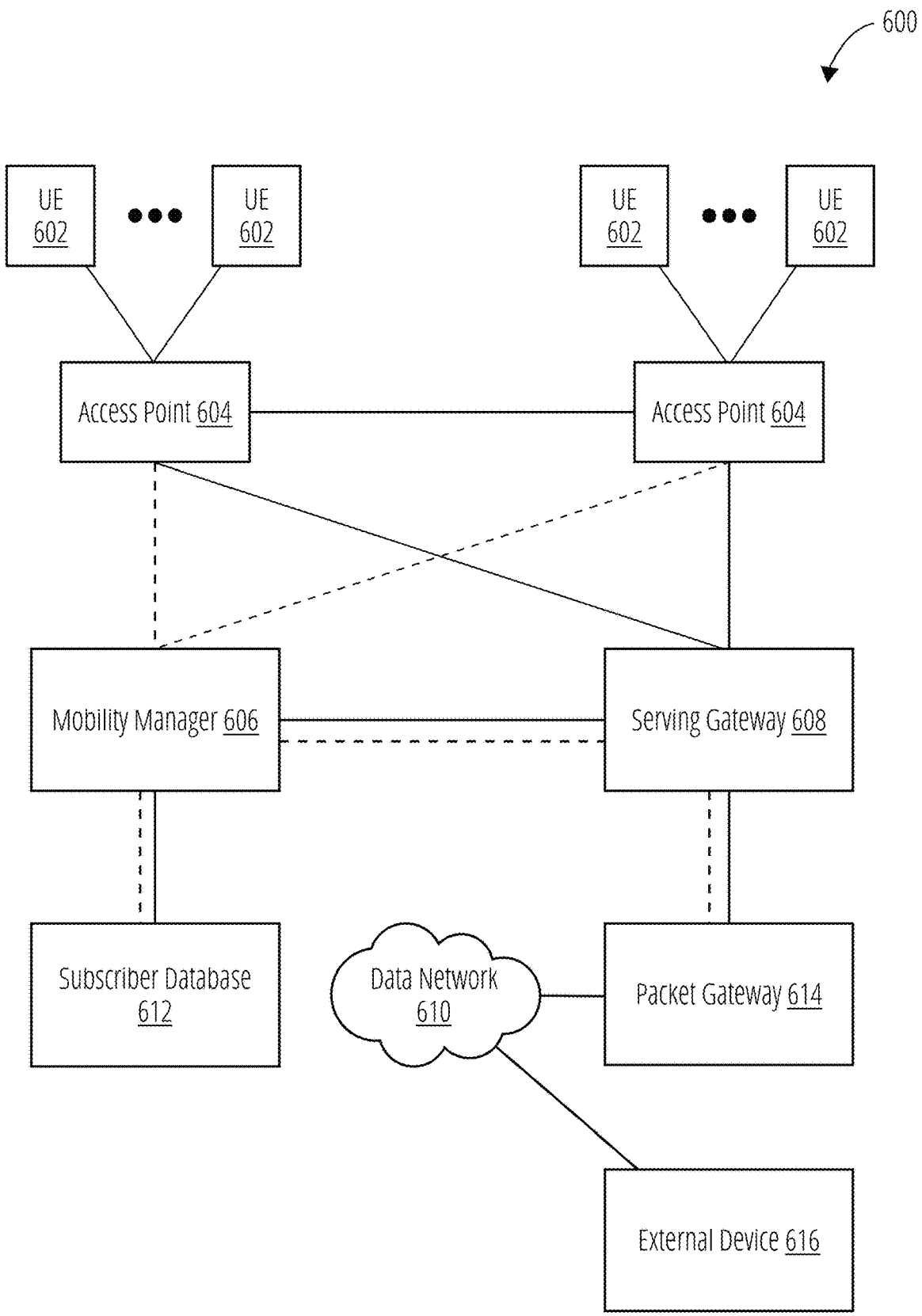
FIG. 6 is a block diagram illustrating a cellular network according to some embodiments.

FIG. 6 is a block diagram illustrating a cellular network according to some embodiments.

In the illustrated embodiment, a system 600 can include UE 602 communicatively connected to access points 604. As seen in FIG. 6, the access points 604 form an access network such as access network 504. In one embodiment, the access points 604 and UE 602 comprise a NextGen Radio Access Network (NG-RAN). In an embodiment, access points 604 comprise a plurality of gNodeB base stations connected to UE 602 via an air interface. In one embodiment, the air interface comprises a New Radio (NR) air interface. In some embodiments, the gNodeB can include multiple network interfaces for communicating with the core network and, specifically, Mobility Manager 606 and Serving Gateway 608. In one embodiment, the Mobility Manager 606 in a 5G network comprises an Access and Mobility Management Function (AMF). In one embodiment, the Serving Gateway 608 comprises a Session Management Function (SMF) for control data or User Plane Function (UPF) for user data.

In another embodiment, access points 604 can comprise eNodeB base stations connected to UE 602 via an air interface. In some embodiments, the air interface comprises an E-UTRAN Uu or LTE Uu radio air interface. In these embodiments, the eNodeB can provide all functionality to implement and operate the air interface and negotiates uplinks and downlinks with the UE 602. In some embodiments, the eNodeB can also include multiple network interfaces for communicating with the core network and, specifically, Mobility Manager 606 and Serving Gateway 608. In one embodiment, the Mobility Manager 606 can comprise a Mobile Management Entity (MME) in a 4G network. In the illustrated embodiment, solid lines between network elements 606, 608, 612, 614 represent user data traffic, while dashed lines between network elements 606, 608, 612, 614 represent control or Non-Access Stratum (NAS) traffic.

In the illustrated embodiment, the Mobility Manager 606 manages control plane traffic while the gateway elements 608, 614 manage user data traffic. Specifically, the Mobility Manager 606 may comprise hardware or software for handling network attachment requests from UE 602. As part of processing these requests, the Mobility Manager 606 accesses a Subscriber Database 612. The Subscriber Database 612 comprises hardware or software that stores user authorization and authentication data and validates users to the network. In some embodiments, the Subscriber Database 612 may comprise a Unified Data Management (UDM) and Unified Data Repository (UDR) in a 5G network. In another embodiment, the Subscriber Database 612 may comprise a Home Subscriber Server (HSS) in a 4G network. In one embodiment, the Subscriber Database 612 may also store a location of the user updated via a Diameter or similar protocol.

The Mobility Manager 606 may also be configured to create data sessions or bearers between UE 602 and Serving Gateway 608 or gateway 614. In one embodiment, the Serving Gateway 608 and gateway 614 may comprise single or separate devices. In general, the Serving Gateway 608 routes and forwards user data packets while also acting as the mobility anchor for the user plane during access point handovers and as the anchor for mobility between different network technologies. For idle state UE 602, the Serving Gateway 608 terminates the downlink data path and triggers paging when downlink data arrives for the UE 602. The Serving Gateway 608 manages and stores UE 602 contexts, e.g., parameters of the IP bearer service, network internal routing information. In a 5G network, the Serving Gateway 608 may be implemented by an SMF. In a 4G network, the Serving Gateway 608 may be implemented by an S-GW.

The Serving Gateway 608 is communicatively coupled to a gateway 614. In general, the gateway 614 provides connectivity from the UE 602 to external Packet Data Networks (PDNs) such as data network 610 by being the point of exit and entry of traffic to external networks (e.g., 610). UE 602 may have simultaneous connectivity with plurality gateways, including gateway 614 for accessing multiple packet data networks. The gateway 614 performs policy enforcement, packet filtering for each user, charging support, lawful interception, and packet screening. In the illustrated embodiment, gateway 614 also limits access to endpoints such as an External Device 616. In a 5G network, the gateway 614 may be implemented by a UPF. In a 4G network, the gateway 614 may be implemented by a P-GW.

In the illustrated embodiment, an External Device 616 is communicatively coupled to the core network via the data network 610. In one embodiment, the data network 610 may comprise the Internet. In the illustrated embodiment, the External Device 616, such as an application server, may comprise any electronic device capable of communicating with the data network 610, and the disclosure is not limited to specific types of network devices.

Figure 7:
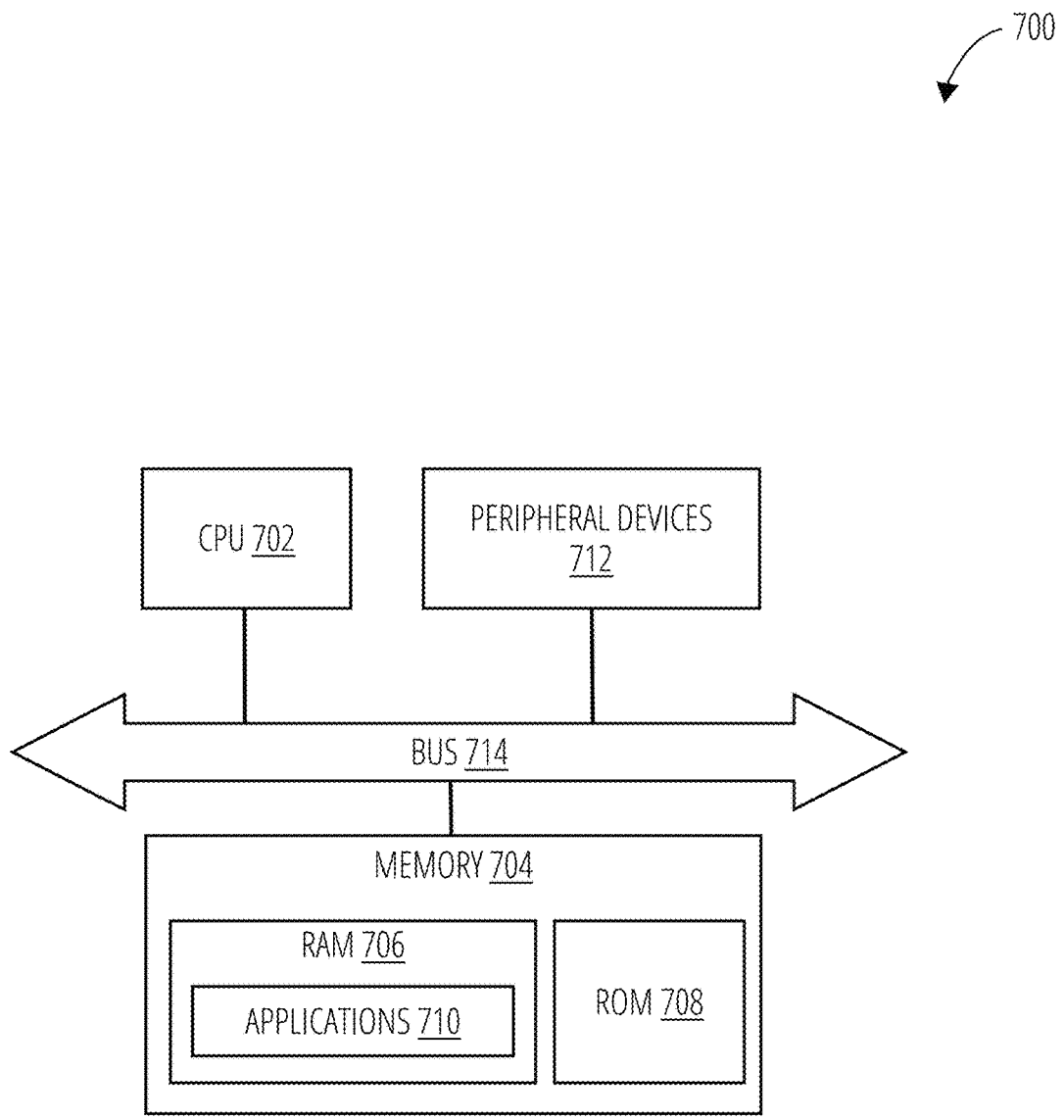
FIG. 7 is a block diagram of a device according to some embodiments.

FIG. 7 is a block diagram of a device according to some embodiments.

As illustrated, the device 700 can include a processor or central processing unit (CPU) such as CPU 702 in communication with a memory 704 via a bus 714. Device 700 can also include one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 can comprise a general-purpose CPU. The CPU 702 can comprise a single-core or multiple-core CPU. The CPU 702 can comprise a system-on-a-chip (SoC) or a similar embedded system. In some embodiments, a graphics processing unit (GPU) can be used in place of, or in combination with, a CPU 702. Memory 704 can comprise a non-transitory memory system including a dynamic random-access memory (DRAM), static random-access memory (SRAM), Flash (e.g., NAND Flash), or combinations thereof. In one embodiment, the bus 714 can comprise a Peripheral Component Interconnect Express (PCIe) bus. In some embodiments, bus 714 can comprise multiple busses instead of a single bus.

Memory 704 illustrates an example of non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device Applications 710 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device 700 can optionally communicate with a base station (not shown) or directly with another computing device. One or more network interfaces in peripheral devices 712 are sometimes referred to as a transceiver, transceiving device, or network interface card (NIC).

An audio interface in Peripheral devices 712 produces and receives audio signals such as the sound of a human voice. For example, an audio interface may be coupled to a speaker and microphone (not shown) to enable telecommunication with others or generate an audio acknowledgment for some action. Displays in Peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 can comprise any input device arranged to receive input from a user. An illuminator in peripheral devices 712 can provide a status indication or provide light. The device can also comprise an input/output interface in peripheral devices 712 for communication with external devices, using communication technologies, such as USB, infrared, Bluetooth™, or the like. A haptic interface in peripheral devices 712 can provide tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving, over a network, information from a content provider, the information corresponding to a request for the content provider to provide content to user equipment (UE) at a location;
communicating, over the network, the received information to a network function (NF) of the network;
receiving, from the NF, UE information;
mapping the UE information to the location;
determining, based on the mapping, whether the UE is authorized to receive the content from the content provider; and
communicating, over the network, information related to the determination to the content provider, the information controlling a mechanism of the content provider for responding to the UE.

2. The method of claim 1, further comprising:
querying, over the network, the NF based on the received information; and
identifying, based on the query, the UE information.

3. The method of claim 2, wherein the UE information comprises information related to at least one of UE location information, an identifier (ID) of the UE and a type of the UE.

4. The method of claim 1, further comprising:
modifying, based on the determination of UE authorization, a level of location granularity; and
enabling, over the network, the content provider to provide the content to the UE based on the modified level of location granularity.

5. The method of claim 1, further comprising:
determining that authorization for the UE is denied; and
communicating, to the UE, a notification indicating the denial.

6. The method of claim 1, further comprising:
providing, based on the determination, access to the content; and
communicating, to the UE, a notification indicating authorization of the access.

7. The method of claim 1, further comprising:
communicating, over the network, a request for content from the UE to the content provider.

8. The method of claim 1, wherein the request from the content provider comprises information related to an Internet Protocol (IP) address of the UE, wherein the IP address is associated with a service provider.

9. The method of claim 8, wherein the received UE information is related to the service provider.

10. The method of claim 1, wherein the UE is a fixed wireless access (FWA) device.

11. A network device comprising:
a processor configured to:
receive, over a network, information from a content provider, the information corresponding to a request for the content provider to provide content to user equipment (UE) at a location;
communicate, over the network, the received information to a network function (NF) of the network;
receive, from the NF, UE information;
map the UE information to the location;
determine, based on the mapping, whether the UE is authorized to receive the content from the content provider; and
communicate, over the network, information related to the determination to the content provider, the information controlling a mechanism of the content provider for responding to the UE.

12. The network device of claim 11, wherein the processor is further configured to:
query, over the network, the NF based on the received information; and
identify, based on the query, the UE information, wherein the UE information comprises information related to at least one of UE location information, an identifier (ID) of the UE and a type of the UE.

13. The network device of claim 11, wherein the processor is further configured to:
modify, based on the determination of UE authorization, a level of location granularity; and
enable, over the network, the content provider to provide the content to the UE based on the modified level of location granularity.

14. The network device of claim 11, wherein the request from the content provider comprises information related to an Internet Protocol (IP) address of the UE, wherein the IP address is associated with a service provider.

15. The network device of claim 14, wherein the received UE information is related to the service provider.

16. A non-transitory computer-readable storage medium storing instructions executable by a processor, wherein the instructions are configured to:
receive, over a network, information from a content provider, the information corresponding to a request for the content provider to provide content to user equipment (UE) at a location;
communicate, over the network, the received information to a network function (NF) of the network;
receive, from the NF, UE information;
map the UE information to the location;
determine, based on the mapping, whether the UE is authorized to receive the content from the content provider; and
communicate, over the network, information related to the determination to the content provider, the information controlling a mechanism of the content provider for responding to the UE.

17. The non-transitory computer-readable storage medium of claim 16, wherein the processor is further configured to:
query, over the network, the NF based on the received information; and
identify, based on the query, the UE information, wherein the UE information comprises information related to at least one of UE location information, an identifier (ID) of the UE and a type of the UE.

18. The non-transitory computer-readable storage medium of claim 16, wherein the processor is further configured to:
modify, based on the determination of UE authorization, a level of location granularity; and
enable, over the network, the content provider to provide the content to the UE based on the modified level of location granularity.

19. The non-transitory computer-readable storage medium of claim 16, wherein the request from the content provider comprises information related to an Internet Protocol (IP) address of the UE, wherein the IP address is associated with a service provider.

20. The non-transitory computer-readable storage medium of claim 19, wherein the received UE information is related to the service provider.

\* \* \* \* \*